Sept. 2, 1952 — J. P. C. RAVEN — 2,608,997
CONTROL VALVE
Filed Jan. 12, 1946
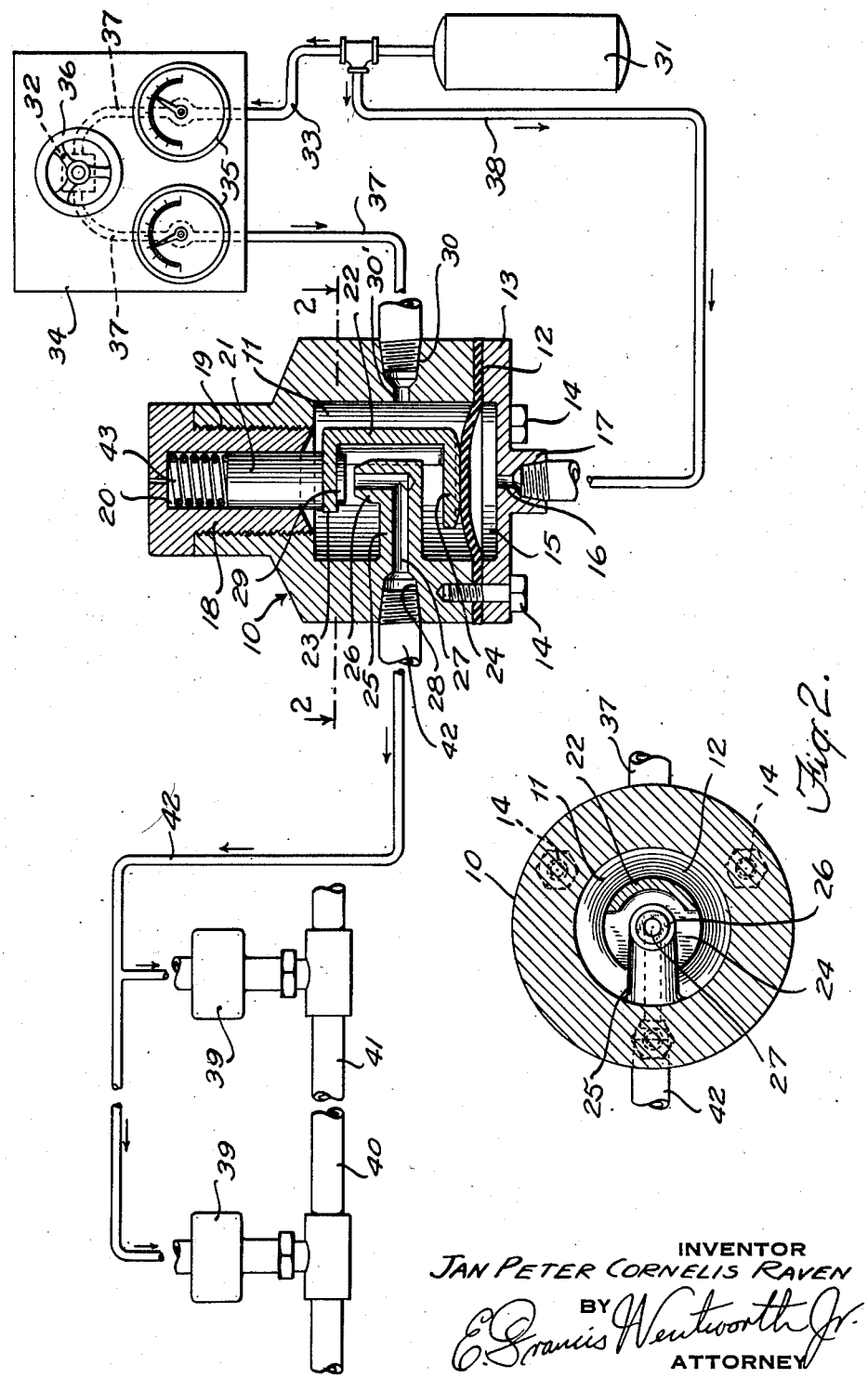
INVENTOR
JAN PETER CORNELIS RAVEN
BY E. Francis Wentworth Jr.
ATTORNEY

UNITED STATES PATENT OFFICE 2,608,997

CONTROL VALVE

Jan Peter Cornelis Raven, New York, N. Y., assignor to Foster Wheeler Corporation, New York, N. Y., a corporation of New York Application January 12, 1946, Serial No. 640,887

3 Claims. (Cl. 137—654)

This invention relates to valves, and more particularly to control valves for controlling the flow of fluid through a conduit.

Normally, control valves to which the present invention relates are actuated by fluid pressure, either air or hydraulic pressure, in order that the desired setting of the valve be obtained and in order that said setting be maintained, the amount of fluid pressure determining the extent to which the valve is either opened or closed thereby controlling the flow of fluid through a conduit. When a pressure failure occurs, such control valves usually move to an extreme opened or an extreme closed position, the setting at which the valves were positioned prior to the pressure failure being released. Such pressure failure may last but for a few moments but when the fluid pressure actuated control valves are in a complex conduit system, for example, in the conduits of an oil refining unit, many hours are generally used in adjusting and resetting the valves to their position at the time of the pressure failure.

The present invention provides a holding or shut-off valve for retaining the setting on a fluid pressure actuated control valve.

The invention will be understood from the following description when considered in connection with the accompanying drawing forming a part thereof in which:

Fig. 1 is a sectional view of the holding valve of the present invention which diagrammatically shows the valve connected to fluid actuated control valves; and Fig. 2 is a sectional view taken on the line 2—2 of Fig. 1.

Like characters of reference refer to like parts throughout the views.

Referring to the drawing, the holding or shut-off valve of the present invention comprises a body 10 having therein a fluid chamber 11. One end of the chamber 11 is closed by a resilient diaphragm 12 which is held in fluid-tight relationship with the chamber by a closure plate 13. Bolts 14 maintain the closure plate 13 in position on the body member. Closure plate 13 has a recess 15 therein which recess is in communication with an inlet passage 16 of an inlet connection 17 on said plate. The opposite end of the chamber 11 is closed by a closure nut 18 which is secured in fluid-tight relationship to the body member 10 by means of screw threads 19 on said nut and in said body member. The nut 18 has a cylinder 20 with a plunger 21 slidably mounted therein to move toward and away from the chamber 11. The plunger 21 is acted upon by a spring 43 and engages a substantially U-shaped valve stem or member 22 one leg of which is engaged by the plunger 21 and the other leg 24 of which is attached to the diaphragm 12. A radial projection 25 extends into the chamber 11 and has a head 26 which projects toward the leg 23 of the stem 22. Projection 25 has a fluid passage 27 in communication with an outlet connection 28 in the body member 12. The passage 27 extends into the head 26. Leg 23 of valve stem 22 is provided with a valve head or closure means 29 adapted to seat on the head 26 in sealing engagement and close the passage 27. Chamber 11 has a fluid inlet passage 30' in communication therewith and in communication with an inlet connection 30 in the body 10.

As shown, a source 31 of fluid under pressure is in communication with a setting control valve 32 through a conduit 33. The setting control valve 32 is mounted on an instrument panel 34 having pressure indicating instruments 35 thereon, said valve being controlled by a hand wheel 36. One side of the setting control valve 32 is connected to the conduit 33, while the other side thereof is connected through a conduit 37 to the inlet connection 30 in the body member 10. Conduit 38 connects inlet connection 17 of the body 10 with the conduit 33 at a point between the source 31 and the setting control valve 32. Fluid pressure actuated control valves 39 control the flow of fluid through conduits 40 and 41. Valves 39 are actuated to the desired setting by fluid pressure admitted therethrough through conduit 42 which is in communication with the outlet connection 28 in the body member 10.

In operation, when the fluid supply is functioning normally, pressure from the source 31 will flow through the conduit 38 into inlet passage 16 thence into the recess 15 causing the resilient diaphragm 12 to move toward the chamber 11 thereby causing the valve stem 22 to move the valve head or closure means 29 away from the projection 26 against the tension of spring 43. Outlet passage 27 is thereby brought into communication with the chamber 11. When the valve head 29 is in its unseated position, the fluid pressure actuated control valves are in communication with the source of fluid pressure 31 through the conduit 42, outlet passage 27, chamber 11, inlet passage 30', conduit 37, control valve 32 and conduit 33. Setting control valve 32 is adjusted to permit sufficient pressure to flow to the valves 39 to adjust valves to the desired setting so that the required amount of fluid may pass through conduits 40 and 41.

Should the fluid pressure in the source 31 fail or decrease for any reason, pressure in the conduit 38 and source 31 would drop. Upon a pressure drop in the recess 15, the pressure on the diaphragm 12 would no longer hold the valve head 29 in an unseated position in relationship to the passage 27, the drop of pressure and the tension of the spring 43 causing the valve head 29 to be seated on the head 26 thereby closing communication between the passage 27 and chamber 11. The valve head 29 is held in its seated position by the tension of the spring 43. Seating of the valve head 29 holds the pressure in the conduit 42 and on the setting mechanism of the fluid pressure actuated control valves 39 so that the setting of the valves is retained. The valve head 29 is maintained in its seated position until the desired amount of pressure is restored in conduit 38 and recess 15 whereupon the valve head 29 is unseated.

Since changes may be effected in the form of the invention selected for disclosure without departing from the principles thereof, it will be understood that the invention is not to be limited excepting by the scope of the appended claims.

What is claimed is:

1. In combination with a valve having fluid-actuated setting means, said setting means being adapted to actuate the valve to a desired setting by fluid under pressure, a source of fluid under pressure, control means for controlling the flow of fluid under pressure, said control means having a fluid inlet and a fluid outlet, conduit means connecting said fluid inlet of the control means and said source, another conduit connecting the fluid outlet of the control means and the fluid-actuated valve setting means, a shut-off valve positioned in said other conduit at a point intermediate the fluid outlet of the control means and the fluid-actuated valve setting means, the shut-off valve comprising a body having a chamber with a fluid inlet in communication with the outlet of said control means and a fluid outlet in communication with the fluid-actuated valve setting means, fluid actuated locking means associated with said shut-off valve for sealing said chamber outlet to prevent the flow of fluid from the fluid-actuated setting means and thereby maintain the pressure therein, and a conduit in communication with said source of fluid under pressure and said fluid-actuated locking means so that fluid pressure at the source is transmitted to the fluid-actuated locking means, the locking means being operable to move to its open position so as to permit the flow of fluid from said chamber outlet when the fluid in said conduit is at a predetermined pressure and to move to its closed position so as to seal said chamber outlet when the fluid pressure at said source decreases below said predetermined pressure to thereby maintain fluid pressure on said valve setting means and retain said first mentioned valve at said desired setting.

2. In combination with a valve having fluid-actuated setting means, said setting means being adapted to actuate the valve to a desired setting by fluid under pressure, a source of fluid under pressure, control means for controlling the flow of fluid under pressure, said control means having a fluid inlet and a fluid outlet, conduit means for connecting said fluid inlet of the control means and said source, another conduit connecting the fluid outlet of the control means and the fluid-actuated valve setting means, a shut-off valve positioned in said other conduit at a point intermediate the fluid outlet of the control means and the fluid-actuated valve setting means, the shut-off valve comprising a body having a chamber with a fluid inlet in communication with the outlet of said control means and a fluid outlet in communication with the fluid-actuated setting means, a fluid actuated member associated with said chamber outlet for sealing the outlet, spring means adapted to act on said member and move the same toward sealing position, a resilient diaphragm operably cooperating with said member and responsive to pressure, and conduit means communicating with said source and said diaphragm so that the diaphragm is responsive to said fluid pressure at the source, the arrangement being such that when fluid is at a predetermined pressure at said source the diaphragm maintains the member out of sealing relationship with said outlet against the tension of said spring so that pressure from the control means flows from the inlet through the chamber to the outlet and when the fluid pressure at the source decreases the spring moves said member into sealing engagement with said outlet and thereby maintain fluid pressure on said valve setting means and retain said first-mentioned valve at a desired setting.

3. In combination with a valve having fluid-actuated valve setting means, said setting means being adapted to actuate the valve to a desired setting by fluid under pressure, a source of fluid under pressure, conduit means in communication with said source of fluid under pressure and with said fluid-actuated setting means, control means associated with said conduit at a point intermediate the source of fluid under pressure and the fluid-actuated setting means for controlling the flow of fluid under pressure to the setting means from said source, valve setting retaining means comprising a shut-off valve in communication with said conduit at a point intermediate the control means and the fluid-actuated setting means, the shut-off valve being disposed in the path of flow of fluid from the control means to said fluid-actuated setting means, fluid-actuated shut-off valve operating means operatively associated with the shut-off valve and constructed to operate the shut-off valve into an opened position to permit the flow of fluid under pressure from the control means to said fluid-actuated setting means and into a closed position to maintain fluid under pressure in said conduit between the shut-off valve and said setting means, and another conduit in communication with the source of fluid under pressure and with the shut-off valve operating means so that fluid pressure at the source is transmitted to the shut-off valve operating means, said fluid-actuated shut-off valve operating means being operable to move the shut-off valve to its open position when the fluid in said other conduit is at a predetermined pressure and to permit the shut-off valve to move to its closed position when the fluid pressure at said source decreases below said predetermined pressure to thereby maintain fluid pressure on said valve setting means and retain said first-mentioned valve at said desired setting.

JAN PETER CORNELIS RAVEN.

REFERENCES CITED

The following references are of record in the file of this patent:

UNITED STATES PATENTS

| Number | Name | Date |
|---|---|---|
| 993,967 | Debauche | May 30, 1911 |
| 1,576,889 | Wulf | Mar. 16, 1926 |
| 2,339,469 | Emanuel | Jan. 18, 1944 |